United States Patent
Alland

(10) Patent No.: US 6,492,938 B1
(45) Date of Patent: Dec. 10, 2002

(54) METHOD OF ASSOCIATING TARGET DATA IN A MULTI-SLOPE FMCW RADAR SYSTEM

(75) Inventor: Stephen William Alland, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/072,230

(22) Filed: Feb. 11, 2002

(51) Int. Cl.$^7$ ............................................... G01S 13/38
(52) U.S. Cl. ........................... 342/129; 342/70; 342/71; 342/72; 342/118; 342/128; 342/130
(58) Field of Search ............................. 342/20, 70–72, 342/122, 125, 130, 128, 129, 118, 145

(56) References Cited

U.S. PATENT DOCUMENTS

| | | | |
|---|---|---|---|
| 5,191,337 A | | 3/1993 | Brovko et al. ............... 342/200 |
| 5,268,692 A | * | 12/1993 | Grosch et al. ............... 342/129 |
| 5,920,280 A | * | 7/1999 | Okada et al. ................ 342/109 |
| 6,011,507 A | * | 1/2000 | Curran et al. ................. 342/70 |
| 6,094,158 A | * | 7/2000 | Williams ..................... 342/157 |
| 6,121,915 A | * | 9/2000 | Cooper et al. ................ 342/70 |
| 6,396,436 B1 | * | 5/2002 | Lissel et al. ................ 342/104 |

* cited by examiner

Primary Examiner—Thomas H. Tarcza
Assistant Examiner—Isam Alsomiri
(74) Attorney, Agent, or Firm—Robert M. Sigler

(57) ABSTRACT

An association method for a multi-slope FMCW radar identifies candidate combinations of frequency components as being correctly or incorrectly associated based on calculated range-rate. Range and range-rate are calculated for various pairs of frequency components emanating from like-polarity slopes of the transmitted waveform, and pairs having similar ranges and range-rates are combined to form candidate associations. The range and range rate of the candidate associations are then computed using all four frequency components, and ambiguous candidate associations are resolved by selecting the candidate associations having similar range rates.

6 Claims, 3 Drawing Sheets

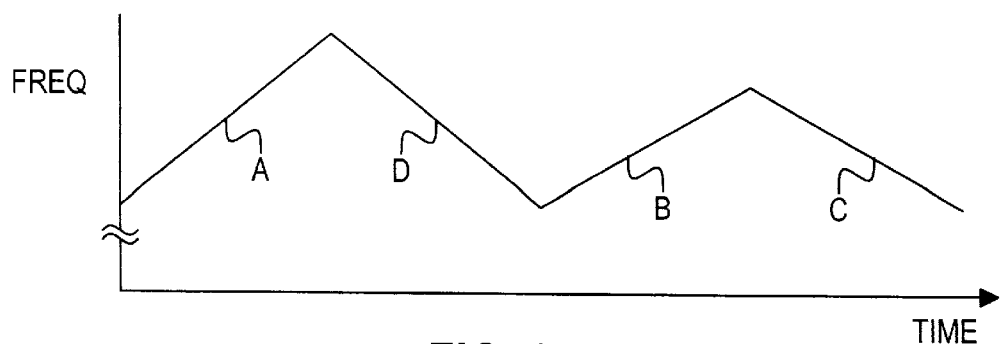
FIG. 2A
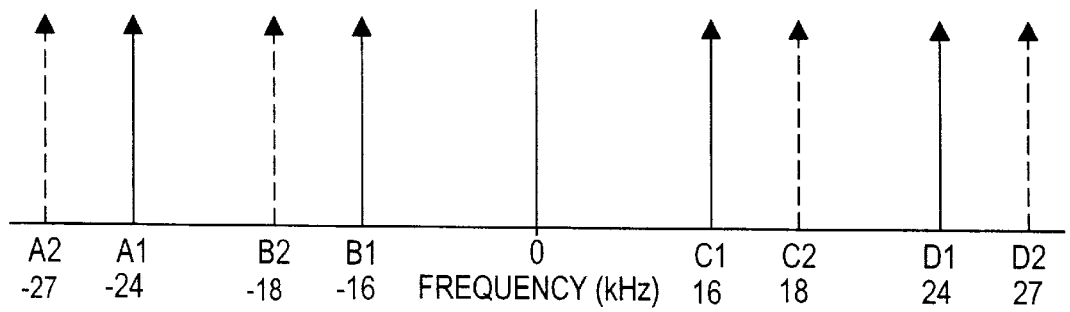
FIG. 2B
|  | A1/B1 | A1/B2 | A2/B1 | A2/B2 |
|---|---|---|---|---|
| C1/D1 | 1 | 2 | 3 | 4 |
| C1/D2 | 5 | 6 | 7 | 8 |
| C2/D1 | 9 | 10 | 11 | 12 |
| C2/D2 | 13 | 14 | 15 | 16 |
FIG. 2C
|  | A | B | C | D | R | RR |
|---|---|---|---|---|---|---|
| 1 | -24 | -16 | 16 | 24 | 40.0 | 0 |
| 16 | -27 | -18 | 18 | 27 | 45 | 0 |
| 4 | -27 | -18 | 16 | 24 | 42.5 | 2.5 |
| 13 | -24 | -16 | 18 | 27 | 42.5 | -2.5 |
FIG. 2D

METHOD OF ASSOCIATING TARGET DATA IN A MULTI-SLOPE FMCW RADAR SYSTEM

TECHNICAL FIELD

The present invention relates to automotive multi-slope frequency-modulated-continuous-wave (FMCW) radar systems, and more particularly to a method of associating data from a distributed object.

BACKGROUND OF THE INVENTION

In FMCW radar systems, the frequency of the emitted radar energy is modulated with multiple frequency rate slopes, and the instantaneous difference in frequencies of the transmitted and reflected waveforms is determined to form a baseband signal including both time delay and Doppler frequency shift information. Thus, at least two frequency rate slopes are needed to determine the range (time delay) and range-rate (Doppler frequency shift) of a single target. However, multiple targets create multiple returns, and three or more frequency rate slopes are needed to identify the reflected waveforms corresponding to each target. In general, the baseband signal is processed using fast Fourier transformation (FFT) and frequency centroiding to identify target-related signal components and an association procedure is then used to associate the identified components with respective targets. Typically, the association procedure identifies the frequency components associated with a given target by determining if certain mathematical relationships linking properly associated components are satisfied. For example, given two potentially related frequency components, the frequency of a third related component can be mathematically predicted, and the presence or absence of a frequency component within a window or gate including on the predicted frequency can be determined. See, for example, the U.S. Pat. No. 5,191,337 to Brovko et al., issued on Mar. 2, 1993, and incorporated by reference herein.

However, when the emitted signal impinges on a distributed or extended target such as a truck or a guardrail, multiple scattering corners on the target produce multiple similar returns, frequently resulting in the presence of multiple frequency components in a single frequency gate. This ambiguity increases the likelihood of incorrectly associating the frequency components, which in turn, leads to errors in the range and range-rate calculations. The usual way of resolving the ambiguity is to select the frequency component that is closest to the predicted frequency; this criterion is referred to as minimum estimation error in Brovko et al. However, the minimum estimation error technique often results in selection of the wrong frequency component, particularly when baseband signal noise and/or errors in the frequency centroiding process shift one or more of the frequency components. Accordingly, what is needed is an improved association method that more reliably identifies frequency components associated with a given target, particularly in the presence of data ambiguity due to returns from a distributed or extended target containing multiple scattering corners.

SUMMARY OF THE INVENTION

The present invention is directed to an improved association method for a multiple-slope FMCW radar wherein candidate combinations of frequency components are identified as being correctly or incorrectly associated based on calculated range-rate. According to the invention, range and range-rate are calculated for various pairs of frequency components emanating from like-polarity slopes of the emitted radar signal, and pairs having similar ranges and range-rates are combined to form candidate associations. The range and range rate of the candidate associations are then computed using all four frequency components, and ambiguous candidate associations are resolved by selecting the candidate associations having similar range rates.

BRIEF DESCRIPTION OF THE DRAWINGS

FIG. 2A is a diagram depicting an example of a frequency modulation pattern utilized by the transceiver of FIG. 1.

FIG. 2B is a frequency centroid diagram of a signal received by the radar antenna of FIG. 1 in response to the frequency modulation pattern of FIG. 2A in the presence of a distributed target having two scattering corners.

FIG. 2C is a matrix diagram showing possible frequency pair associations based on the centroid diagram of FIG. 2B.

FIG. 2D is a chart depicting computed range and range-rate values for selected two-pair associations from the matrix of FIG. 2C.

DESCRIPTION OF THE PREFERRED EMBODIMENT

Figure 1:
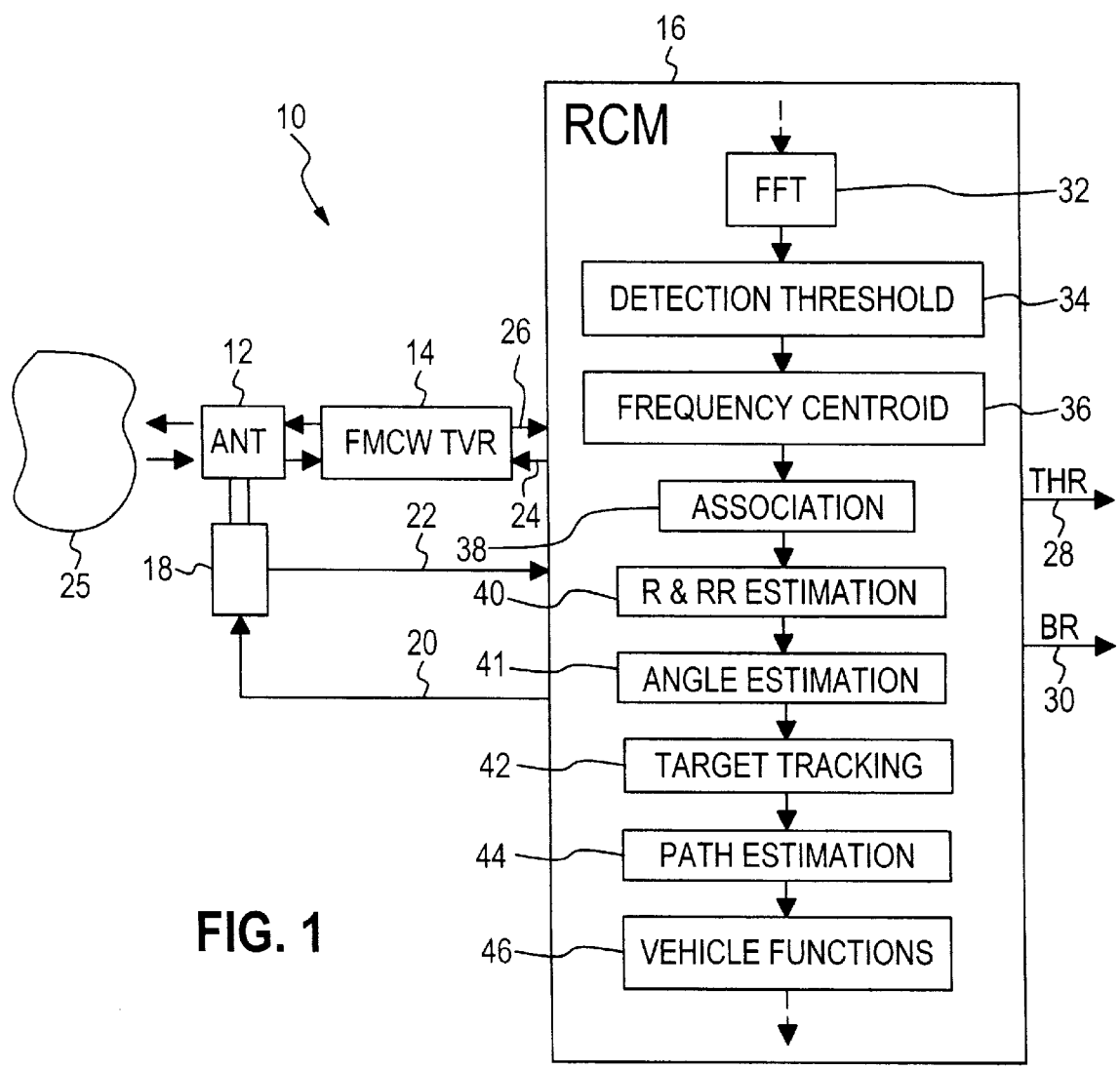
FIG. 1 is a diagram of an automotive radar system including a radar antenna, a FMCW transceiver, and a microprocessor-based radar control module.

Referring to FIG. 1, the present invention is disclosed in the context of an automotive forward-looking multi-slope FMCW radar system 10 that is designed to support vehicle control functions such as adaptive cruise control, collision warning, or collision avoidance, but that is applicable to multi-slope FMCW radar systems in general. The system 10 as depicted includes a radar antenna 12, a frequency modulated continuous wave transceiver (FMCW TVR) 14, a radar control module (RCM) 16 and an electric motor 18 configured to sweep the antenna 12 in the azimuth field of view. Activation of motor 18 is controlled by RCM 16 via line 20, and a motor position sensor (not shown) supplies a position feedback signal to RCM 16 via line 22. Of course, the method of this invention is also applicable to fixed beam or electronically scanned beam FMCW radar systems. In operation, RCM 16 activates FMCW TVR 14 via line 24 to supply a frequency modulated radar waveform to antenna 12, which emits the radar energy in a forward field of view. A portion of the energy impinging upon an object or target 25 is reflected back to the antenna 12 (which may be a separate receive antenna if desired) and received by FMCW TVR 16, which supplies a frequency difference or baseband signal to RCM 16 via line 26.

The RCM 16 is essentially a digital signal processor, and performs various functions including those designated by the blocks 32–46. As indicated by blocks 32, 34 and 36, RCM 16 utilizes a fast Fourier transformation (FFT) with detection thresholding and frequency centroiding to identify target-related frequency components of the baseband signal. An association procedure is then used to associate the identified components with respective targets as indicated at block 38. Thereafter, the block 40 computes the range (R) and range-rate (RR) of the respective targets using the associated components, the block 41 estimates the azimuth angle of the targets, and the block 42 uses the range and range-rate data to track one or more of the closest targets.

The block 44 refers to path estimation of the host vehicle, and the block 46 designates vehicle-related functions such as adaptive cruise control, collision warning, or collision avoidance. The vehicle-related outputs in FIG. 1 include an engine throttle signal THR on line 28 and a brake signal BR on line 30.

As indicated previously, the present invention is directed to an improved association method that more effectively associates the various received frequency components with the corresponding target. While previously known association methods such as described in the aforementioned U.S. Pat. No. 5,191,337 to Brovko et al. relied exclusively on frequency prediction, the present invention associates the received frequency components primarily based on similarities in range and range-rate. In general, this is achieved by forming potential pairs of frequency components, associating those pairs exhibiting similar range and range-rate, and then analyzing the associated pairs based on range-rate to eliminate ambiguities that tend to occur with distributed or extended targets.

Figure 3:
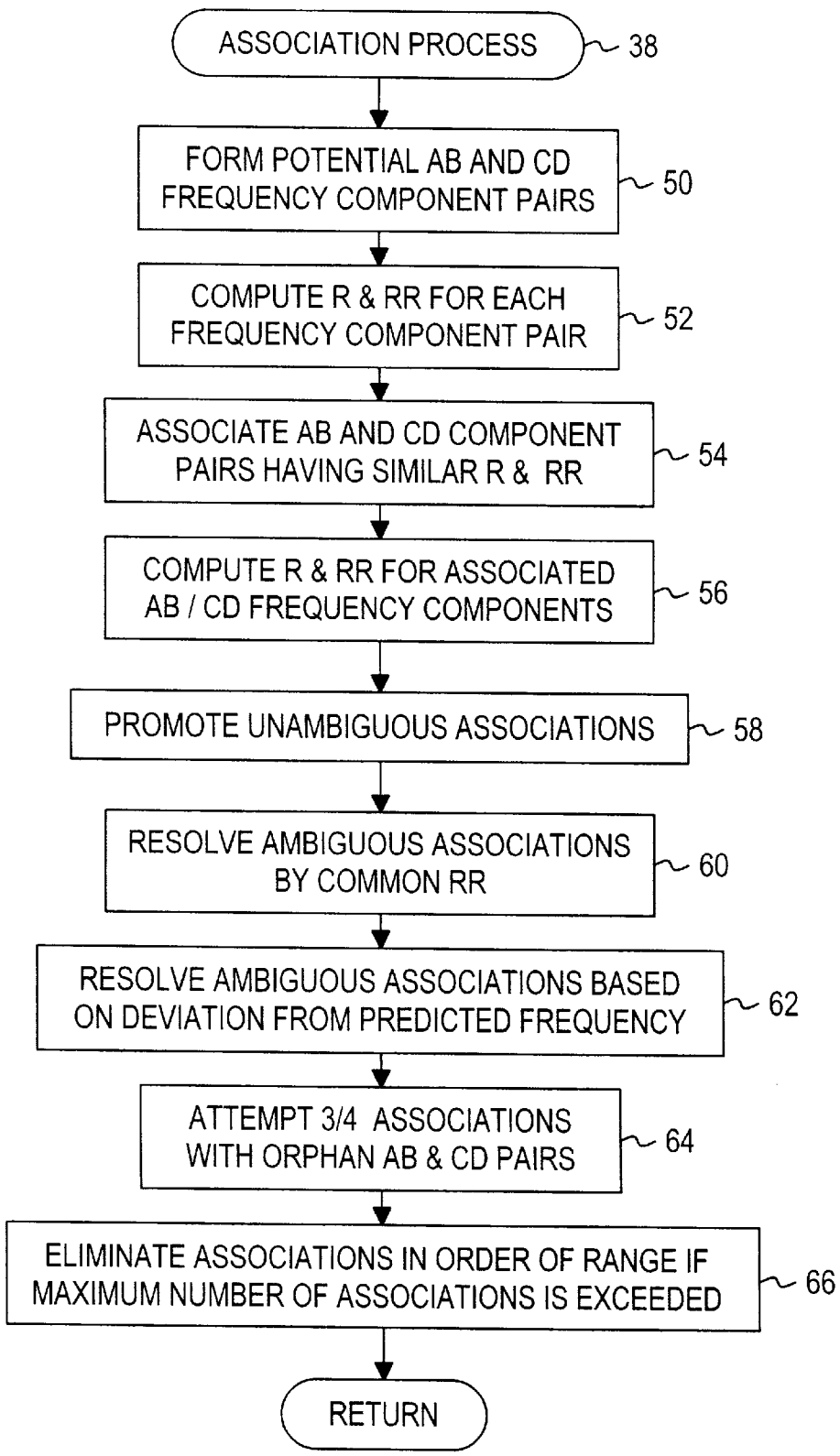
FIG. 3 is a flow diagram illustrating the method of this invention as carried out by the radar control module of FIG. 1.

The method steps are set forth in the flow diagram of FIG. 3, and are illustrated in part by the diagrams of FIGS. 2A–2D. Referring first to FIG. 2A, the subject association method is illustrated in the context of a four-slope FMCW radar system, where the frequency slopes are identified by the capital letters A, B, C and D. For example, the slopes A and D may be +90 GHz/sec and –90 GHz/sec, respectively, and the slopes B and C may be +60 GHz/sec and –60 GHz/sec, respectively. In the illustrated example, the emitted radar signal impinges on an extended target 25 having two scattering corners and traveling at a speed substantially equal to that of the host vehicle. In this situation, the baseband signal supplied to RCM 16 by FMCW TRV 14 will contain one fundamental frequency component per slope per scattering corner, for a total of eight fundamental frequency components. The RCM 16 identifies these frequency components by fast Fourier transformation, detection thresholding and frequency centroiding, as mentioned above in reference to blocks 32, 34, 36 of FIG. 1, such components being designated in FIG. 2B by the vertical lines at frequencies A1, A2, B1, B2, C1, C2, D1, D2. The letters A, B, C and D of the frequency designations correspond to the slopes A, B, C and D of the transmitted frequency, while the numerals 1 and 2 of the frequency designations correspond to the first and second scattering corners of the target 25.

The first step of the association process is to form potential pairs of associated frequency components from like-polarity slopes of the transmitted radar signal, as indicated at block 50 of FIG. 3. The correctly associated pairs are those pairs generated by the same scattering corner of the target 25; incorrectly associated pairs combine components from different scattering corners. The various possible A/B and C/D component pairs are illustrated along the top and left side of the matrix of FIG. 2C; in the illustrated example, there are four possible AB pairs (A1/B1, A1/B2, A2/B1, A2/B2) and four possible CD pairs (C1/D1, C1/D2, C2/D1, C2/D2). In practice, frequency gating may be used to limit the number of possible component pairs, knowing the maximum target range of interest and the modulation slopes of the transmitted signal.

The next steps of the association process involve computing the range R and range-rate RR for each of the component pairs and associating component pairs having similar range and range-rate, as indicated at blocks 52 and 54 of FIG. 3. The relationship among R, RR, the component frequency f, the corresponding modulation slope S, and the carrier frequency wavelength WL is given by the equation:

$$f = -(2*R*S/c) - (2*RR/WL)$$

where c is the speed of light in air. Thus, with two frequencies f1 and f2 corresponding to two like-polarity modulation slopes S1 and S2, the two unknowns R and RR may be determined by simultaneous solution of the equations:

$$f1 = -(2*R*S1/c) - (2*RR/WL),$$

and $$f2 = -(2*R*S2/c) - (2*RR/WL)$$

The mis-matched CD frequency component pairs (C1/D2, C2/D1) are from like-polarity slopes of the transmitted signal, but combine components from different scattering corners; accordingly, the range and range-rates computed using such pairs will in most cases be dissimilar to the range and range-rate values computed with any of the AB frequency component pairs. Thus, the potential four-component associations designated by the matrix cells 5–12 are eliminated from further consideration. The range and range-rate values computed from the correctly matched C/D component pairs (C1/D1, C2/D2) will be similar to the values computed from the correctly matched AB pairs (A1/B1, A2/B2) but in most cases dissimilar to the values computed with any of the incorrectly matched A/B frequency component pairs (A1/B2, A2/B1). Thus, the potential four-component associations designated by the matrix cells 2, 3, 14 and 15 are eliminated from further consideration, leaving the potential four-component associations designated by the matrix cells 1, 4, 13 and 16 (that is, A1/B1/C1/D1, A2/B2/C1/D1, A1/B1/C2/D2, A2/B2/C2/D2). The degree of similarity or dissimilarity in range and range-rate is judged by determining if the normalized or statistical distance Dnorm between AB and CD pairs is less than a predetermined value such as unity, where Dnorm is defined as:

$$D\text{norm} = [|(R_{AB} - R_{CD})|/R\text{gate}] + [|(RR_{AB} - RR_{CD})|/RR\text{gate}]$$

where $R_{AB}$ and $R_{CD}$ are the computed ranges for a given AB and CD pair, $RR_{AB}$ and $RR_{CD}$ are the computed range-rates for the given AB and CD pair, Rgate is a range gate (which may have a nominal value of 10 m., for example) and RRgate is a range-rate gate (which may have a nominal value of 10 m/sec., for example).

The next steps of the association process involve computing the range R and range-rate RR for each of the identified four-component associations designated by the matrix cells 1, 4, 13 and 16, promoting any unambiguous associations, and resolving ambiguous associations, as indicated at blocks 56, 58 and 60 of FIG. 3. For each four-component association having frequencies f1, f2, f3 and f4, the target range R is computed according to:

$$R = [1/(2*(K_A^2 + K_C^2))] * [K_A*(f4-f1) + K_C*(f3-f2)]$$

where $K_A$ and $K_C$ are positive coefficients based on the modulation slopes A and C, respectively. The range-rate RR is computed in terms of the Doppler frequency DF (the average of the frequencies f1, f2, f3 and f4) and the wavelength WL according to:

$$RR = -(WL * DF)/2$$

The chart of FIG. 2D lists representative frequencies of the component associations designated by the cells 1, 4, 13 and 16 of FIG. 2C, along with computed range R and range-rate RR for such associations. Since there are no unambiguous associations (that is, there are two possible A/B component pairs for each of the C/D component pairs not eliminated at block 54), the ambiguous associations are resolved by checking for similar range-rate. As indicated in FIG. 2D, the associations of matrix cells 1 and 16 both exhibit a range-rate of zero (since the target 25 is traveling at the same speed as the host vehicle in the current illustration), whereas the associations of matrix cells 4 and 13 yield different range-rate values. Thus, the associations A1/B1/C1/D1 (cell 1) and A2/B2/C2/D2 (cell 16) are verified as being correctly matched, and the associations A1/B1/C2/D2 (cell 13) and A2/B2/C1/D1 (cell 4) are eliminated as being incorrectly matched.

Since the presence of noise or rounding error in the centroiding process will produce some variation in one or more of the identified frequencies f1, f2, f3, f4, the association steps of blocks 54 and 60 do not required exact identity of computed range-rate, but rather identify range-rate values within a predefined window or gate. For example, an error of −500 Hz in component C1 will produce a range-rate error of approximately +0.25 m/sec in the associations A1/B1/C1/D1 (cell 1) and A2/B2/C1/D1 (cell 4). Thus, the range-rate window or gate must accommodate a certain level of error. Additionally, it should be noted that with the same degree of error, the minimum estimation error technique described in the aforementioned U.S. Pat. No. 5,191,337 to Brovko et al. would predict a B-slope frequency component of −18.5 kHz instead of −16.0 kHz, resulting in incorrect association of the component pair A2/B2 with the component pair C1/D1 (i.e., cell 4). Accordingly, the minimum estimation error technique is only utilized according to this invention in cases where detected ambiguity cannot be resolved by the range-rate criterion, as indicated at block 62 of FIG. 3.

The block 64 of FIG. 3 recognizes that under certain range rate conditions (opening or closing), one of the four components Ax, Bx, Cx, Dx generated by a given scattering corner x can be very low in frequency, and therefore not detectable. In such case, an attempt is made to identify three-component associations using the previously eliminated A/B and C/D component pairs. For example, the A and B frequencies corresponding to a given CD component pair that has not been associated with an AB component pair may be predicted as described in the aforementioned U.S. Pat. No. 5,191,337 to Brovko et al. If one of the predicted frequencies is too low for reliable detection, frequency gating may be used to determine if the other of the predicted frequencies is sufficiently close to the corresponding frequency component to form a three component association. If multiple frequency components satisfy the frequency gate, the minimum estimation error technique may be used to identify the component with the smallest frequency difference.

Finally, the block 66 is executed to determine if the number of verified associations exceeds a maximum number of associations (based on the processing limitations of RCM 16, for example). If so, one or more associations having the highest range values are eliminated from further consideration.

In summary, the association method of the present invention more reliably associates frequency components from a given target even when the target is extended and has multiple scattering corners. It will be understood, of course, that while the method has been described in reference to the illustrated embodiment, it is expected that various modifications in addition to those mentioned above will occur to those skilled in the art. For example, the method of this invention is equally applicable to FMCW systems that have a higher number of transmitted frequency slopes. In this regard, it will be recognized that references herein to a "pair of frequency components" is specific to radar implementations having two like-polarity FMCW slopes, and that a more general designation such as a "set of frequency components" may be more appropriate in a general sense. Thus, it will be understood that methods incorporating these and other modifications may fall within the scope of this invention, which is defined by the appended claims.

What is claimed is:

1. A method of operation for a radar system that transmits a multiple-slope frequency modulated continuous wave signal and identifies primary frequency components of a baseband signal containing range and range-rate information for targets in a field of view of the radar system, the method comprising the steps of:

forming potentially related sets of frequency components by associating potentially related frequency components from like-polarity slopes of the transmitted signal;

computing range and range-rate values based on each of the formed sets, and comparing such values to identify those sets of frequency components that are potentially attributable to a given target;

combining potentially related sets of the identified frequency components from opposite-polarity slopes of the transmitted signal;

computing range and range-rate values for each of the combined sets of frequency components, and identifying combined sets of frequency components that are attributable to the given target as those having a substantially identical range-rate; and attributing the computed range and range-rate of the identified combined sets of frequency components to the given target.

2. The method of operation of claim 1, wherein the step of computing range and range-rate values based on each of the formed sets, and comparing the computed range and range-rate values to identify those sets of frequency components that are potentially attributable to a given target includes the steps of:

selecting a first set of frequency components from a first polarity of the transmitted signal and a second set of frequency components from a second polarity of the transmitted signal;

computing first range and range-rate values based on the first set of frequency components and second range and range-rate values based on the second set of frequency components;

normalizing a difference between the first and second range values with respect to a nominal range value, and normalizing a difference between the first and second range-rate values with respect to a nominal range-rate value; and determining that the first and second set of frequency components are potentially attributable to a given target if a sum of the normalized range and range-rate differences is less than a predetermined value.

3. A method of operation for a radar system that transmits a frequency modulated continuous wave signal having N different frequency slopes and identifies N primary baseband frequency components for each radar scatterer in a field of view of the radar system, the method comprising the steps of:

forming potentially related sets of N/2 frequency components by associating potentially related frequency components from like-polarity slopes of the transmitted signal;

computing range and range-rate values based on each of the formed sets, and comparing such values to identify those sets of frequency components that are potentially attributable to a given target;

combining potentially related sets of N identified frequency components from opposite-polarity slopes of the transmitted signal;

computing range and range-rate values for each of the combined sets of N frequency components, and identifying combined sets that are attributable to the given target as those having a substantially identical range-rate; and attributing the computed range and range-rate of the identified combined sets of N frequency components to the given target.

4. The method of operation of claim 3, wherein the step of computing range and range-rate values based on each of the formed sets, and comparing the computed range and range-rate values to identify those sets of frequency components that are potentially attributable to a given target includes the steps of:

selecting a first set of N/2 frequency components from a first polarity of the transmitted signal and a second set of N/2 frequency components from a second polarity of the transmitted signal;

computing first range and range-rate values based on the first set of frequency components and second range and range-rate values based on the second set of frequency components;

normalizing a difference between the first and second range values with respect to a nominal range value, and normalizing a difference between the first and second range-rate values with respect to a nominal range-rate value; and determining that the first and second set of frequency components are potentially attributable to a given target if a sum of the normalized range and range-rate differences is less than a predetermined value.

5. A method of operation for an automotive radar system that transmits a frequency modulated continuous wave signal having N different frequency slopes and identifies N primary baseband frequency components for each of one or more scatterers in a field of view of the radar system, the method comprising the steps of:

forming potentially related sets of N/2 frequency components by associating potentially related frequency components from like-polarity slopes of the transmitted signal;

computing range and range-rate values based on each of the formed sets, and comparing such values to identify those sets of frequency components that are potentially attributable to a target having more than one scatterer;

combining potentially related sets of N identified frequency components from opposite-polarity slopes of the transmitted signal;

computing range and range-rate values for each of the combined sets of N frequency components, and identifying combined sets that are attributable to said target as those having a substantially identical range-rate; and attributing the computed range and range-rate of the identified combined sets of N frequency components to said target.

6. The method of operation of claim 5, wherein the step of computing range and range-rate values based on each of the formed sets, and comparing such values to identify those sets of frequency components that are potentially attributable to a target having more than one scatterer includes the steps of:

selecting a first set of N/2 frequency components from a first polarity of the transmitted signal and a second set of N/2 frequency components from a second polarity of the transmitted signal;

computing first range and range-rate values based on the first set of frequency components and second range and range-rate values based on the second set of frequency components;

normalizing a difference between the first and second range values with respect to a nominal range value, and normalizing a difference between the first and second range-rate values with respect to a nominal range-rate value; and determining that the first and second set of frequency components are potentially attributable to said target if a sum of the normalized range and range-rate differences is less than a predetermined value.

* * * * *